W. F. KIESEL, Jr.
TRAILER TRUCK FOR LOCOMOTIVES.
APPLICATION FILED MAR. 1, 1909.

929,768.

Patented Aug. 3, 1909.
5 SHEETS—SHEET 1.

WITNESSES:
M. E. Verbeck
Rowree R. Moss

INVENTOR
William F. Kiesel Jr.
BY
Eugene Diven
ATTORNEY

W. F. KIESEL, Jr.
TRAILER TRUCK FOR LOCOMOTIVES.
APPLICATION FILED MAR. 1, 1909.

929,768.

Patented Aug. 3, 1909.
5 SHEETS—SHEET 3.

WITNESSES:
M. E. Verbeck.
Roswell R. Moss.

INVENTOR
William F. Kiesel, Jr.
BY
Eugene Niven
ATTORNEY

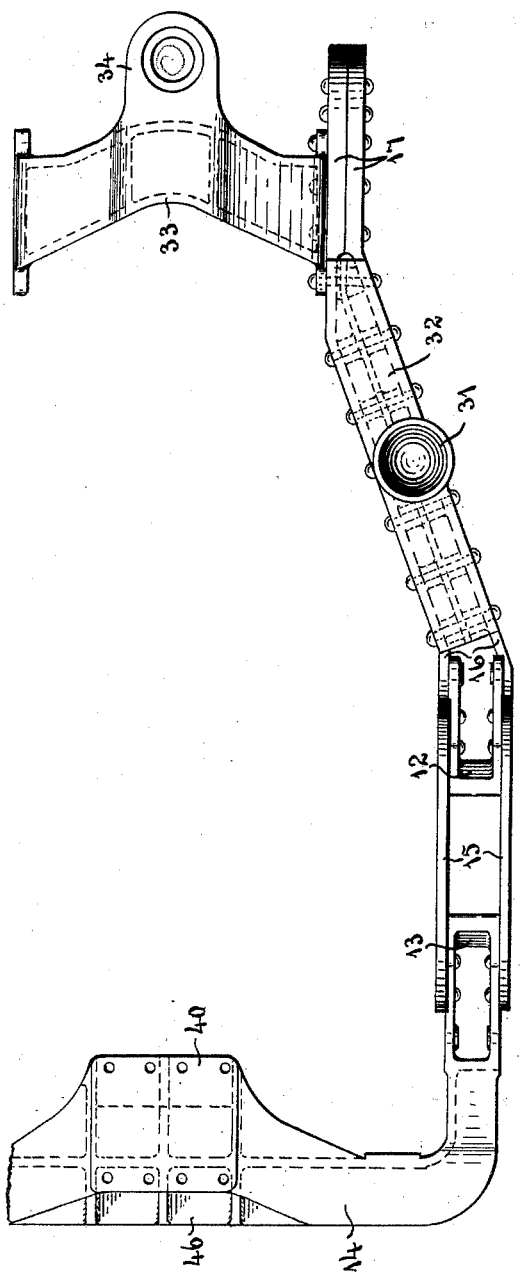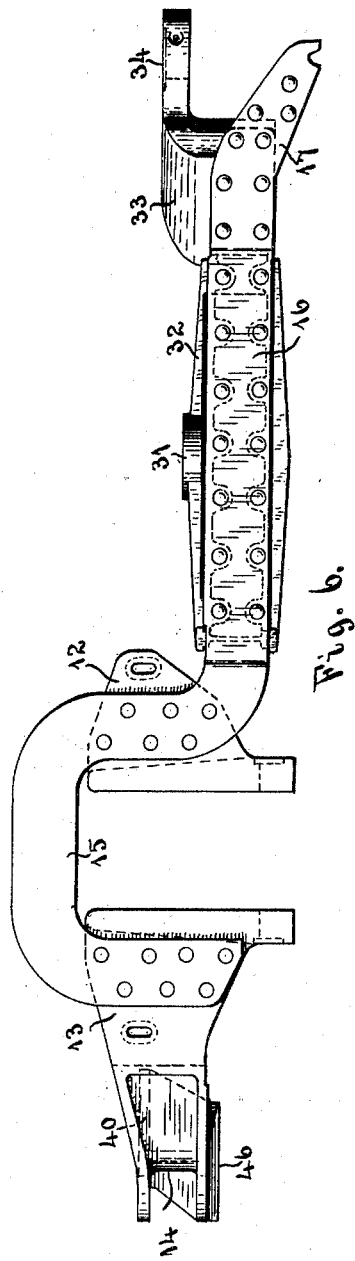

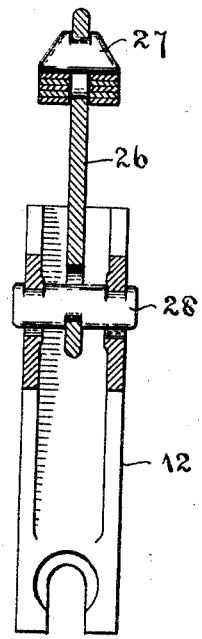
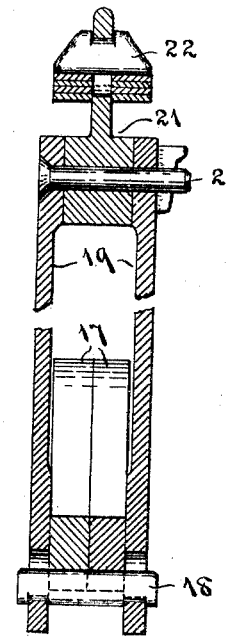

UNITED STATES PATENT OFFICE.

WILLIAM F. KIESEL, JR., OF ALTOONA, PENNSYLVANIA.

TRAILER-TRUCK FOR LOCOMOTIVES.

No. 929,768.  Specification of Letters Patent.  Patented Aug. 3, 1909.

Application filed March 1, 1909. Serial No. 480,501.

*To all whom it may concern:*

Be it known that I, WILLIAM F. KIESEL, Jr., a citizen of the United States, residing at Altoona, in the county of Blair and State of Pennsylvania, have invented certain new and useful Improvements in Trailer-Trucks for Locomotives, of which the following is a specification.

This invention relates to improvements in trucks for supporting locomotive boilers at the rear of the back drivers; one of my objects being to provide a truck, the frame of which will be fulcrumed in front of the ashpan, the rear portion of the frame being susceptible of any desirable side motion, and the frame itself acting as an equalizer between the rear end of the back driver springs and the trailer axle springs.

A further object is to provide a novel friction bearing for the main frame where it rests upon the truck frame, whereby there will be introduced a certain amount of frictional resistance to the side movement of the truck, for the purpose of compelling the front truck of the locomotive to operate to its limit of side motion before the trailer truck has any side motion: and a final object is to provide a centering device for returning the trailer truck to central position after movement to one side or the other, in rounding curves, and the like.

I attain my objects by constructing the truck in the manner illustrated in the accompanying drawings, in which—

Figure 1:
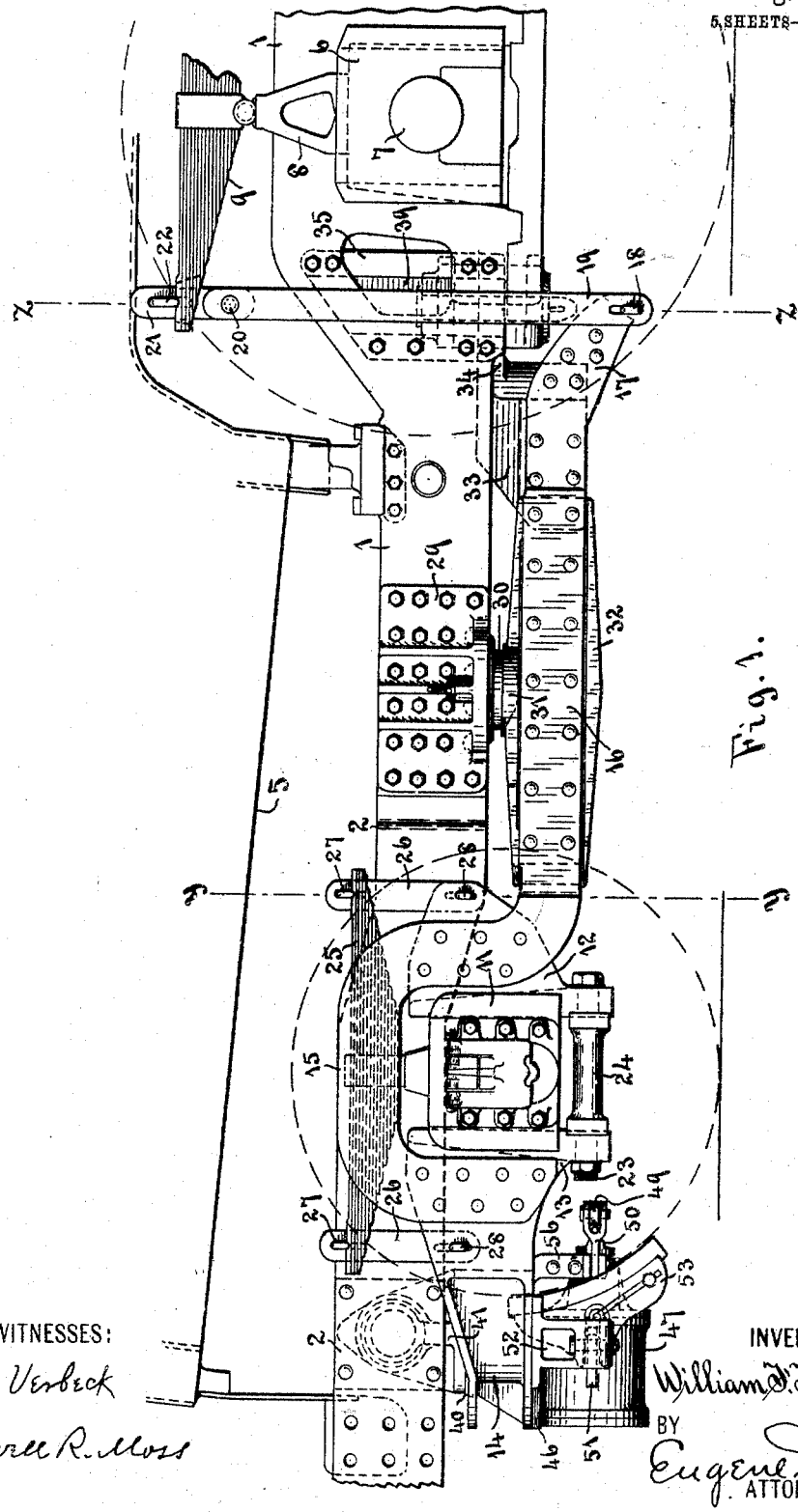
Figure 2:
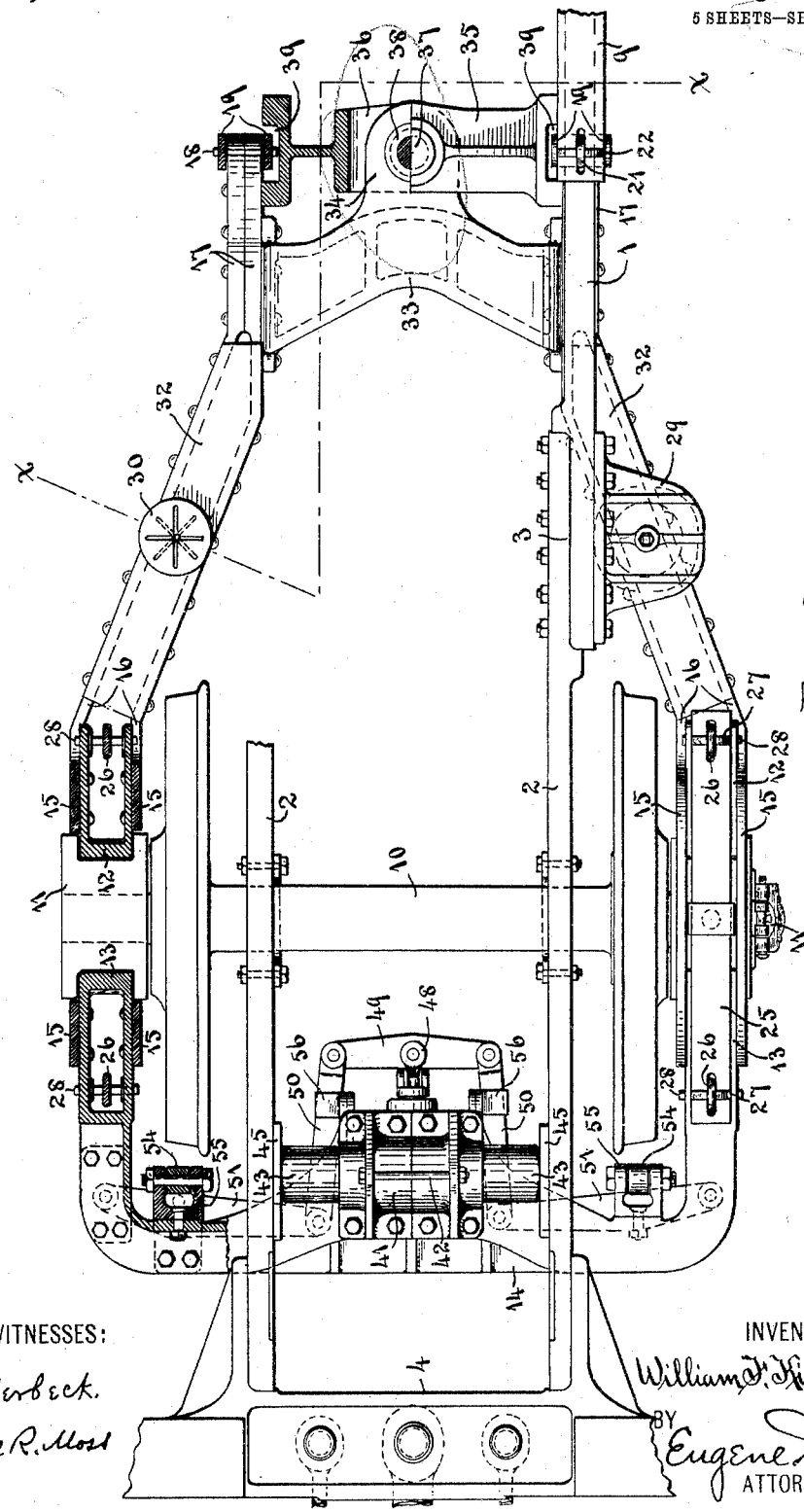
Figure 3:
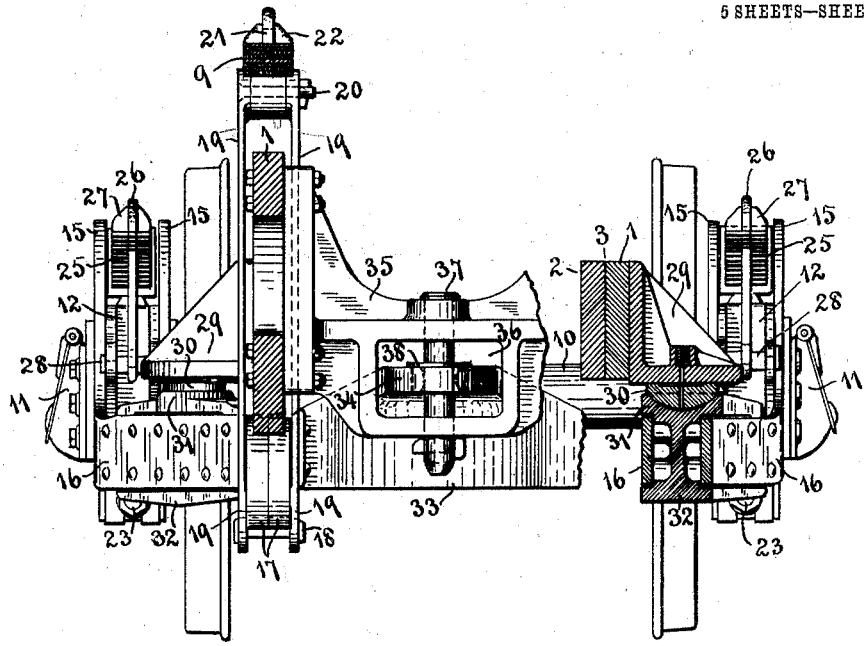
Figure 4:
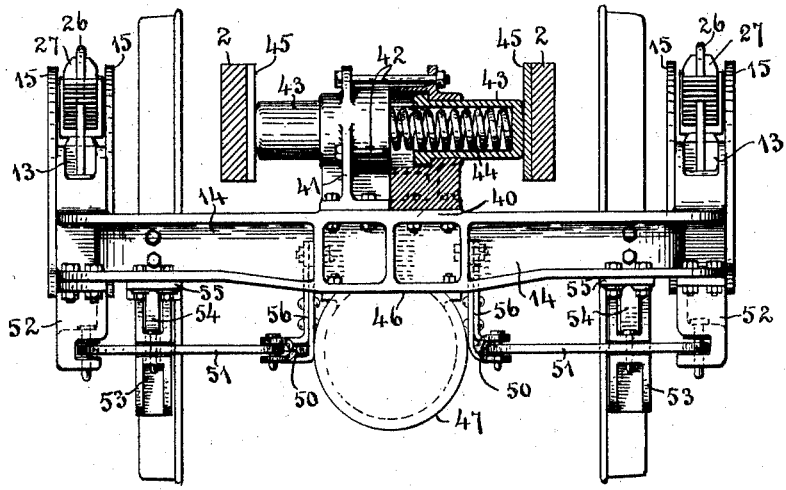

Figure 1 represents a side elevation of the truck, as applied to the rear portion of a locomotive frame; Fig. 2, a plan view of the same, portions being shown in section; Fig. 3, a front elevation of the truck, parts being shown sectioned on the line $x$—$x$ in Fig. 2; Fig. 4, a rear elevation of the truck, with one-half of the centering device shown in section; Figs. 5 and 6, a plan view and side elevation, respectively, of the truck frame; Fig. 7, a detail showing a sectional view of the hanger connections between the truck springs and pedestals, on the line $y$—$y$ in Fig. 1; Fig. 8, a similar sectional view of the hanger connections between the back driver springs and the truck frame on the line $z$—$z$ in Fig. 1; Fig. 9, a detail showing the bushing for the fulcrum eye where the trailer truck is coupled to the main frame; and Figs. 10 and 11, details showing the spring hanger coupling bars.

Like numerals designate like parts in the several views.

As herein illustrated the main frame of the locomotive at the rear of the back drivers consists of two parts, 1 and 2, spliced together at 3, the frame members 2 being carried to the rear and fastened to a cross piece 4, to which the tank is coupled. The firebox is supported over this portion of the locomotive sideframes, as indicated at 5. The axle for the back driver is shown at 7 in Fig. 1, axle boxes 6 therefor being mounted in the frame members 1, in the usual manner, with supports for the springs 9 resting upon the axle boxes, the forward ends of said springs being coupled to the sideframes in any approved manner. The trailer truck axle 10 is journaled in axle boxes 11 outside the truck wheels, said axle boxes being slidably mounted between pedestals 12 and 13. These pedestals are preferably of cast steel, the rear pedestals 13 being integrally joined by the flanged and ribbed cross piece 14, which constitutes the rear end of the trailer truck frame. The pedestals 12 and 13 are fastened together by goose necks formed on the sideplates 16 of the truck frame, said side plates being in pairs and the goose neck portions thereof being riveted to the inward and outward sides of the pedestals. These sideplate pairs 16 are bent so as to approach one another toward the forward end of the truck, where the two members of each pair are brought together and project forward in line with and beneath the main sideframes 1 at 17. The forward ends of these united plates are carried downward somewhat and notched to rest upon cross bars 18, which are supported by links 19 at each side, said links being coupled at their upward ends, by pins 20, to single links 21, which pass through slots provided therefor in the springs 9, said links 21 being supported upon the springs by the cross bars 22, notched at their upward ends to receive the links, and fitted into notches in the springs at their lower ends, whereby articulated hangers are provided between the springs 9 and the side members of the truck frame, to permit of the forward and back movements of said truck frames, when the truck turns upon its fulcrum. The pedestals 12 and 13 are coupled together at their lower ends by the bolt 23, which passes through a filling piece 24. Half elliptic springs 25 rest upon the axle boxes 11, and are coupled by hangers 26 to the front and rear pedestals 12 and 13, respectively, by means of the notched cross bars 27 and 28, cross bars 27 being the same form as the cross bars 22 on the back driver springs, and the cross bars 28 being formed as illustrated in Figs. 7 and 11. The hangers 26 pass down between the side wings formed on the pedestal castings, to which the goose necks 15 are riveted; said side wings being slotted to receive the cross bars 28 in the manner illustrated in Fig. 7, and the links being also slotted to permit said cross bars to be passed therethrough in assembling the parts.

At the points where the main frame members 1 and 2 are spliced together, there are bolted in, by the splice bolts, brackets 29, which project outwardly at each side of the locomotive, said brackets resting upon plano convex disks 30, which in turn are mounted in concave bearings formed on the upper sides of the castings 32, which are riveted in between the side plates 16 of the truck frame. The brackets 29 are provided with suitable grease cups and passages whereby lubricant may be fed to radial grooves formed on the upper and lower faces of the disks 30, the lower grooves being connected to the upper ones by a central duct, as shown in Figs. 2 and 3. As the truck moves to one side or the other of the main frame, the disks 30 slide across the under face of the brackets 29, and the convex surfaces of said disks permit the vertical tilting of the truck frame relatively to the main frame members. While the lubricating of this bearing provides for freedom of motion without cutting and wear between parts, there is still sufficient friction generated to attain the object heretofore specified. The location of these brackets and bearings determines the equalization of the load between the back driver and the truck wheels.

The sidewise motion of the truck takes place around the fulcrum pin 37, carried by the cross piece 35, which is a casting bolted in between the frame members 1 at the rear of the back driver axle, said cross piece being provided with an opening 36, into which a forward projection, or eye piece, 34 enters from the fulcrum piece 33, which is riveted in between the forward ends 17 of the truck sideplates; said opening permitting a limited vertical motion of the fulcrum piece relative to the locomotive frame. The fulcrum eye on the projection 34 is provided with a bushing 38, the bore of which is made flaring from the center outwardly in both directions, to permit the endwise and sidewise tilting of the truck frame, or the locomotive main frame, as the case may be. The side flanges of the cross piece 35 are grooved vertically at 39, to permit of the passage therethrough of the inward hanger links 19, the width of said groove being sufficient to permit of the forward and back play of said links, as the truck swings about its fulcrum.

The cross piece 14 of the truck frame is provided at 40 on its upward side with a bedplate upon which is bolted a supporting case 41, for the centering device. This case is made in two parts, said parts being fastened together by means of bolts 42. Projecting outwardly through lateral guide openings in the case 41 are hollow flanged thimble shaped followers 43; said followers being forced outwardly under the tension of a spring 44 to engage bearing plates 45, fastened to the inward sides of the main frame members 2. Movement of the truck frame to one side or the other causes one of these followers to be pushed inward against the tension of spring 44, said spring acting through the follower to return the truck frame to central position, when relieved from side thrust, the intention being that the spring capacity shall be just sufficient to overcome the friction at the bearing disks 30.

The whole brake operating mechanism for the truck, including the brake cylinder, is hung from the cross piece 14, as shown in Figs. 1, 2, and 4; said cross piece having bolted to an under plate, formed thereon at 46, the brake cylinder 47, which is connected to the main air system by any suitable flexible connection, not shown. A piston rod is coupled at 48 to a cross bar 49, to which, at each end, are coupled links 50, which in turn are coupled to the brake levers 51, said brake levers being fulcrumed in brackets 52, bolted to the under flange of the cross piece 14. The brake clogs 53 are coupled to these levers 51, as shown in Fig. 4, and are hung from brackets 55 by means of links 54. The coupling links 50 are supported by guide brackets 56, attached to the forwardly projecting webs on the cross piece 14 between the supporting bedplates 40 and 46.

What I claim as my invention is—

1. A trailer truck pivoted on the main frame of a locomotive at the rear of the back driver axle, and bearings on the truck frame between the pivot point and truck axle upon which the main frame rests.

2. A trailer truck pivoted on the main frame of a locomotive at the rear of the back driver axle, and friction bearings on the truck frame between the pivot point and truck axle across which the main frame is adapted to slide.

3. A trailer truck pivoted on the main frame of a locomotive at the rear of the back driver axle, concave bearing sockets at each side of the truck between the pivot point and truck axle, plano-convex disks resting in said sockets, and bearings on the main frame resting upon said disks.

4. A trailer truck pivoted on the main frame of a locomotive at the rear of the back drivers, bearings on the truck frame between the pivot point and truck axle upon which the main frame rests, and equalizer spring connections between the main frame and truck frame.

5. A trailer truck pivoted on the main frame of a locomotive at the rear of the back driver axle, bearings on the truck frame between the pivot point and truck axle upon which the main frame rests, springs on the truck axle boxes, hangers coupling the springs to the truck frame at front and rear of said axle boxes, springs on the back driver axle boxes, and hangers coupling the truck frame to said springs at the rear of said axle boxes.

6. A trailer truck pivoted on the main frame of a locomotive at the rear of the back driver axle and susceptible of side motion at its rear end, bearings on the truck frame between the pivot point and truck axle upon which the main frame rests, and a spring actuated centering device on the truck frame acting in conjunction with the main frame to return the truck to central position.

7. A trailer truck pivoted on the main frame of a locomotive at the rear of the back driver axle and susceptible of side motion at its rear end, and a brake apparatus for the truck wheels, including cylinder and levers, carried by the truck frame at the rear end thereof.

8. A truck coupled at one end by a vertical pivot pin to the main frame of a locomotive between the side frames thereof and susceptible of side motion at the other end, the sides of the truck frame being carried outside of the locomotive side frames and provided with bearings at points between the pivot point and truck axle, and outwardly projecting brackets on the side frames resting upon said bearings.

9. A truck coupled at one end by a vertical pivot pin to the main frame of a locomotive between the side frames thereof and susceptible of vertical movement on said pin, the other end of the truck being free to move sidewise, bearings on the truck frame between the pivot point and truck axle upon which the main frame rests, and a spring connection between the pivoted end of the truck and the main frame.

10. A truck coupled at one end by a vertical pivot pin to the main frame of a locomotive between the sides thereof in alinement with correspondingly opposite ends of half elliptic main frame springs and susceptible of vertical movement on the pin, hangers coupling said ends of the springs to the truck frame, and bearings on the truck frame between the hangers and truck axle upon which the main frame rests.

11. The combination, in a railway vehicle, of side frames, axle boxes mounted in said frames, half elliptic springs resting upon said boxes, a cross-piece fastened to the side frames between correspondingly opposite ends of the springs, a truck frame having an eye-piece at one end projecting into an opening at the center of the cross-piece, a pivot pin passing vertically through the cross-piece and eye-piece, hangers coupling said ends of the springs to the truck frame, and bearings on the truck frame between the hangers and truck axle upon which the side frames rest.

12. The combination, in a railway vehicle, of side frames, axle boxes mounted in said frame, half elliptic springs resting upon said boxes, a truck frame pivoted on a cross-piece fastened to the side frames between correspondingly opposite ends of the springs, hangers suspended from said ends of the springs, said hangers comprising double links which pass downward at each side of the side frames, cross bars connecting the lower ends of said links, and members at the sides of the truck frame resting upon said cross bars between links.

13. The combination, in a truck, of axle boxes slidably mounted in pedestals on the truck frame, half elliptic springs resting upon said boxes, hangers passing through slots in the ends of the springs and into vertical openings in the pedestals below the springs, and cross-bars passing through the upper and lower ends of the hangers to couple them to the springs and pedestals.

14. The combination, in a truck, of half elliptic springs resting upon the axle boxes, pedestals for said boxes having vertical openings below the ends of the springs, hangers slotted at each end, the upper ends of said hangers being passed through vertical slots in the spring ends, cross bars passing through the upper hanger slots and resting upon the springs, and cross bars passing through the lower hanger slots and corresponding slots in the pedestal sides, said cross bars being notched where engaged by the ends of the respective slots to hold them in place.

15. The truck frame comprising pedestals for the axle boxes, side plates in pairs having goose necks at one end between which the pedestals are fastened, a cross piece fastened between the side plates at their other ends, a pivot eye at the center of said cross piece, and bearing pieces fastened between the plates of each pair intermediate the ends.

16. The combination, with a railway vehicle having side frames with axle boxes mounted therein and half elliptic springs resting upon said boxes, of a truck frame having pedestals in which axle boxes are mounted outside the truck wheels, the sides of the truck frame being bent inward into alinement with the side frames and thence carried beneath the side frames to points under one end of said springs, hangers connecting said ends of the springs to the truck sides, a cross-piece between the truck sides pivoted to a cross-connection between the side frames, brackets projecting outwardly from the side frames over the bends of the truck sides, and bearings upon said sides upon which the brackets are slidably mounted.

17. The combination, with the side frames of a railway vehicle, of a truck pivoted between the side frames at one end and provided with a spring actuated centering device at the other end, said device comprising a casing having lateral openings, followers projecting from and adapted to slide through said openings to a limited extent, and a spring between the followers acting to push them outward, said followers engaging the inward sides of both side frames when in central position.

In testimony whereof I have affixed my signature, in presence of two witnesses.

WILLIAM F. KIESEL, Jr.

Witnesses:
J. FOSTER MECK,
J. C. STORM.